United States Patent [19]

Reiter

[11] 4,053,729

[45] Oct. 11, 1977

[54] METHOD AND ARRANGEMENT OF MASSES AVOIDING CHATTERING

[76] Inventor: Lothar Reiter, Johann Straussgasse 27, A-1040, Vienna, Austria

[21] Appl. No.: 668,768

[22] Filed: Mar. 19, 1976

[51] Int. Cl.² ............................................. H01H 3/60
[52] U.S. Cl. .................................... 200/288; 267/159
[58] Field of Search ...................... 267/158, 159, 160; 200/283, 246, 250, 288; 335/46

[56] References Cited

U.S. PATENT DOCUMENTS

| 1,269,917 | 6/1918 | Field | 200/283 |
|---|---|---|---|
| 2,265,297 | 12/1941 | Little | 200/246 |
| 3,541,287 | 11/1970 | Wilson et al. | 200/283 |

*Primary Examiner*—James B. Marbert
*Attorney, Agent, or Firm*—John T. O'Halloran; Thomas M. Marshall

[57] ABSTRACT

This invention relates to a chatter-free arrangement of masses especially for such a chatter-proof arrangement in electrical switches and mechanical interrupters of current of all kinds. The arrangement of masses disclosed is constructed so that the kinetic energy of the two masses of pushing partners being pushed is absorbed by additional damping masses arranged in the direction of the push. The mass of the following mass or masses, in the direction pointing away from the two primary masses of the pushing partners is constructed to that the additional and successive mass or masses is decreasing and in that same direction the elasticity and the energy loss factor and, or the mobility of the additional masses is increasing. Such decreasing masses permit lighter chatter-free constructions and permits not only stationary parts but also moving parts to be provided with chatter-free arrangements, especially for example in electrical contacts. By decreasing the proportion of the mass to elasticity, with respect to the primary masses of impact, an increasing velocity is achieved making possible effective transformation of energy in known elastic materials with a high energy loss factor.

5 Claims, 10 Drawing Figures

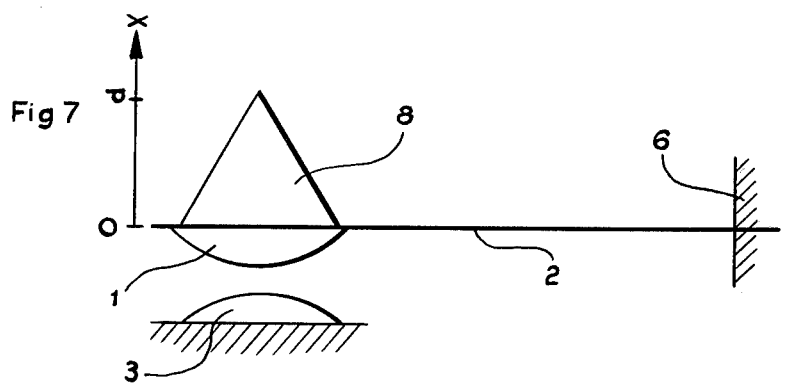
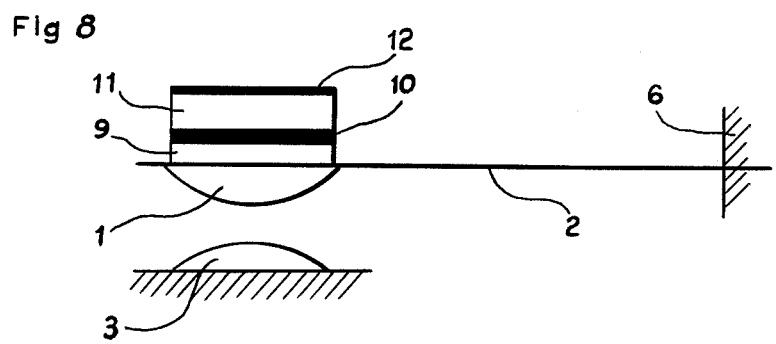
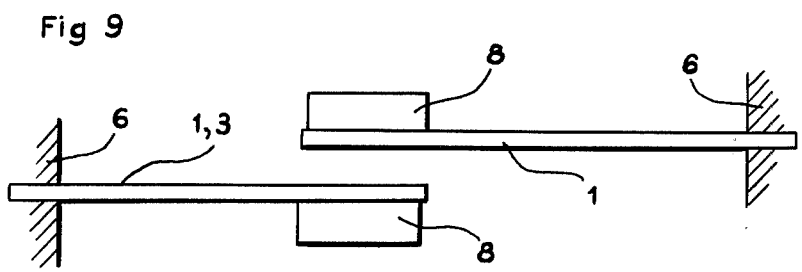
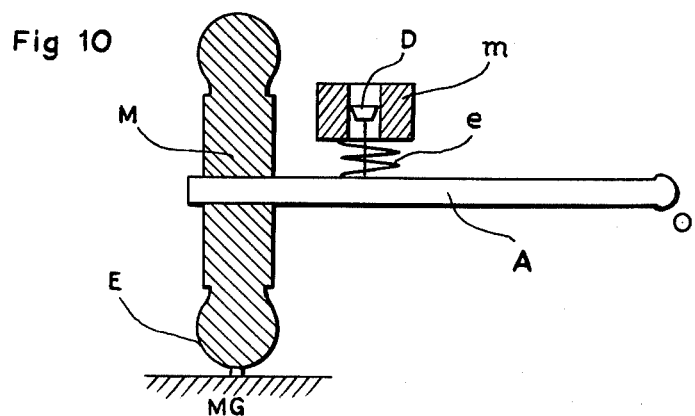

METHOD AND ARRANGEMENT OF MASSES AVOIDING CHATTERING

BACKGROUND OF THE INVENTION

1. Field of the Invention

Arrangements for avoiding chattering of mechanical elements, and specifically, electro-mechanical contacts.

2. Prior Art

It has long been known that the chattering of mechanical components sometimes effects the lifetime of a mechanical arrangement. A special problem arises in connection in the chattering with electro-mechanical contacts. In order to reduce the chattering of contcts there are different methods provided by the prior art which are either very expensive or act only to reduce the time of chattering. Such arrangements which provide for the complete suppression of chattering often leads to influencing the reliability of operations and the lifetime of the contact. In German Pat. No. 1,803,401 the kinetic energy of the contact blades is adsorbed by friction between the contact blade and a damping blade. It is also known that there is a problem caused by the raising of the pressure and the friction power which reduces the time of chattering but also reduces the lifetime of the contacts because of the higher abrasion of the metal to metal interface.

Some good results have been achieved by the prior art by the method which consists of absorbing the kinetic energy by impacting it on a mechanical chain of impacts. In German Pat. Nos. 887,970 and 847,461 the chain of impact consists of either similar or enlarging masses. The solution provided by those German patents results in an arrangement of contacts which is very large, heavy and very complicated. Accordingly, they are useful only for resting contacts with a base.

For this reason such an arrangement is not useful in the existing trend in the art for miniaturization and simplification of construction. The inner friction of metallic bodies during impact is small, therefore, very long chains of impacts are necessary to provide sufficient damping of a wave of impact. The arrangement of masses avoiding chattering according to this invention avoids such disadvantages and is useful for absorption of kinetic energy of mechanical parts of any kind endangered by chattering and vibration, independent of size and shape, especially of contacts.

SUMMARY OF THE INVENTION

In the method and means of this invention the arrangement of masses which avoids chattering and vibration of mechanical parts endangered by chattering is such that the kinetic energy of two masses of pushing partners being pushed is absorbed by additional damping masses arranged in the direction of the push, characterized by providing in the direction pointing away from the two primary masses of the pushing partners, the mass of the following mass or masses is reduced and in that same direction the elasticity and the energy loss factor and/or the mobility of the additional masses is increasing. By providing the additional decreasing masses, lighter constructions are possible whereby the stationary mechanical parts as well as the moving parts and especially those of the electrical contact can be constructed to be chatter-free. By decresing the proportion of mass to elasticity which decreases from the primary masses of impact, an increasing velocity can be achived which makes possible an effective transformation of energy with a high energy loss factor thereby the chatter free arrangement of this invention is a simplified one causing more reliable operation and a longer lifetime of the contact.

In the preferred embodiment of this invention at least one of the primary masses of pushing partners and for each following mass the product of the mass times elasticity is approximately constant.

In a further preferred embodiment at least one primary mass of pushing partners and for each following mass, the following mass amounts to between two thirds and one tenth of the preceding mass. By these preferred embodiments a more complete transfer of the kinetic energy from one mass to the following smaller mass, taking over the energy is achieved.

In a further preferred embodiment a damping arrangement with respect to the movement bears and/or brakes the following mass or masses taking over (absorbing) the energy. Thus it is possible for a single following mass to be sufficient and furthermore the mass is slowed so much that when returning to the primary impact partner mass it cannot initiate chattering.

In a further embodiment at least one of the primary masses of the pushing partners and the following mass and elasticities, or only the following mass and elasticity approximate a kinetic transmission line which in the direction pointing away from the primary masses of the push partners the mass per unit length is decreasing, however, elasticity per unit length and damping factor is increasing. By this arrangement the mechanical impedance decreases with the distance from the primary impact partner mass hence the velocity is increasing of the following smaller masses whereby an effective damping is possible by well-known elastic, especially well-known non-metallic materials.

Another embodiment is characterized by providing an arrangement in which the product mass per unit length times elasticity per unit length of the kinetic transmission line remains approximately constant. This effects a more complete absorption of the kinetic energy of the impact partner mass endangered by chattering.

In a still further embodiment the following masses and elasticities are arranged in layers either as a layer fixed on the mass endangered by chattering or a layer movable on that mass. Thus not only is the production of mechanical parts with reduced chattering provided for but also it is possible to apply such layers later to reduce chattering. A further advantage lies in the possibility of protecting areas of mechanical parts from chattering and vibrations. If a layer is applied a long life and reliable operation is guaranteed by the chattering reducing arrangement of this invention.

BRIEF DESCRIPTION OF THE DRAWINGS

FIG. 7 shows the principle of an electro-mechanical contact which has applied on a contact mass a following mass in accordance with this invention;

FIG. 8 is an illustration of a further embodiment of this invention illustrating an electro-mechanical contact;

FIG. 9 is a further example of the embodiment of this invention in a reed contact; and FIG. 10 is a schematic illustration of the principle of this invention applied to a wheel and axle arrangement.

DESCRIPTION OF THE PREFERRED EMBODIMENTS

In the following description the FIGURES of this invention and the principles of this invention will be described by a number of primary examples.

Figure 1:
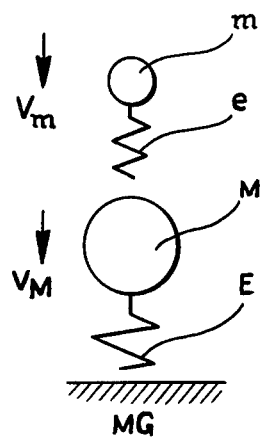
FIG. 1 is a diagrammatic illustration of the principles of this invention.

FIG. 1 shows the principle of this invention in which a mass M which can be endangered by chattering which is referred to throughout as the primary impact partner mass. In the illustration it is accompanied by a following mass $m$ and an elasticity $e$ which touches the first mass in such a way that the velocity $v_m = v_m = v$. Under certain prerogatives the kinetic energy $Mv_M^2/2$ of the mass M will be completely conveyed to the smaller following mass m, at the reflection area of the assumed fixed or respectively indefinite large counter mass MG. After this, the smaller mass leaves the mass M in the opposite direction with a velocity $v < ((m+M)/m)$ or respectively, with the kinetic energy $(m+M)(v^2/2)$ whereby the mass M endangered by chattering with its elasticity E remains without energy on the counter mass MG. The requirements for a complete change-over of energy are the correct relations of the masses and the elasticities associated with the reflection. In most respects the fact is that the relationship of m/M is relatively uncritical (especially good amounts lay between $(2/3) > m/M > (1/10)$ ), it is particularly advantageous to arrange the parts so that the product mass M times elasticity E (between mass M and counter mass MG) are approximately similar to the product of mass $m$ times elasticity $e$ (between mass M and mass M). In other words, the inherent frequencies which are given by the product of mass times elasticity for $m$ and $e$ or M and E, respectively, shall be approximately similar. At an eventual return of the additional mass $m$ the adherence of mass M to counter mass MG must be so large or respectively, the returning additional mass m must have lost so much energy, this means velocity, that mass M is not able anymore to lift itself from the counter mass MG.

Figure 2:
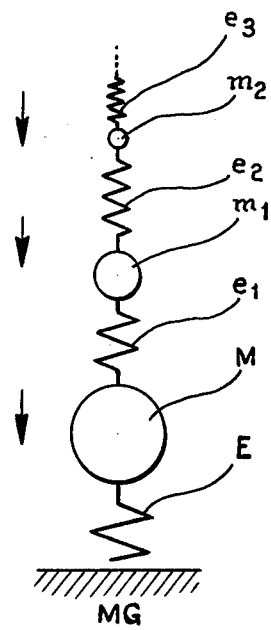
FIG. 2 is a further diagrammatic illustration of the principles of this invention.

FIG. 2 shows an arrangement similar to that illustrated in FIG. 1. However, the additional masses comprise a mechanical chain structure of concentrated masses ($m_1$, $m_2$, etc.) and elastic elements ($e_1$, $e_2$, $e_3$, etc.) which comprise a impedance transforming mechanical chain. The kinetic energy of mass M at its reflection on counter mass MG is conveyed to the following mass in the direction of abscissa $x$ thereby an energy wave W is built up in the abscissa $x$ after which the masses return to a stop. Since the mechanical impedance becomes smaller with the distance $x$, dependent on the ratio of mass to elasticity, the velocity of masses grows with the distance $x$. Now the effective damping of the energy wave occurs, i.e., by the inner losses of friction of known material in such a way that the end of this travelling time chain reflected energy wave has been attenuated and after the return in twice the time of travelling it cannot excite the mass M. Thereby the kinetic travelling time chain of FIG. 2, in contrast to a mobile single mass $m$ (see FIG. 1) can remain connected by elastic elements to the mass M. It is important to arrange all of the masses in the direction parallel to the vector of the impact.

Figure 3:
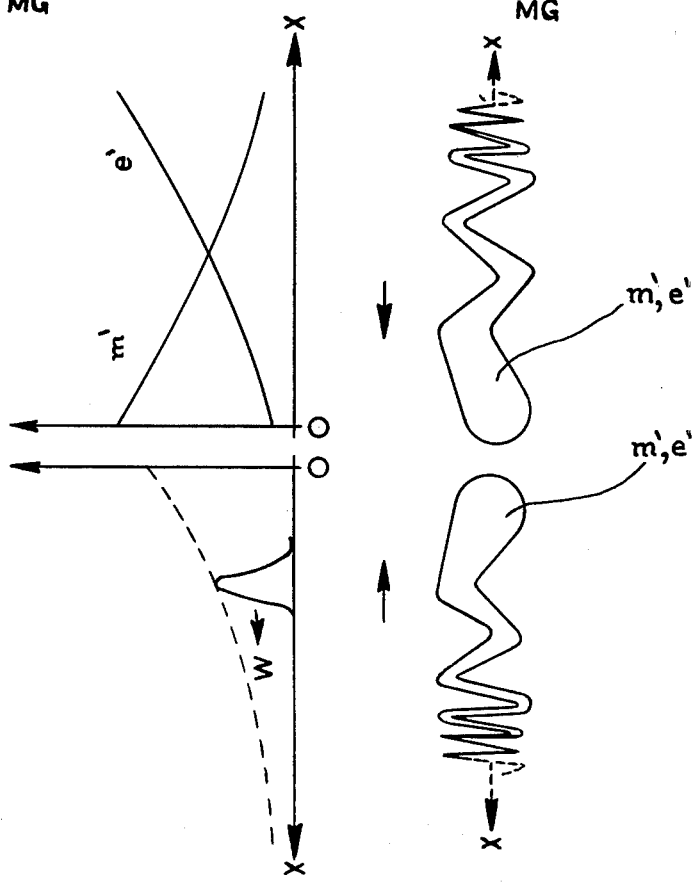
FIG. 3 is a diagrammatic illustration of the principles of this invention.

If the counter mass MG, i.e., the other primary impact partner, is a mobile mass which is, compared to the other impactpartner mass not very much larger, it is necessary that the counter mass be provided with additional following masses. The mass endangered by chattering can be itself a part of the following mass in accordance with the teachings of this invention. FIG. 3 shows this possibility as an example.

FIG. 3 illustrates two partners of impact whereby each of them consists in a divided mass per unit length $m'$ reducing with distance $x$ and elasticity per unit length $e'$ growing with distance $x$ comprising a kinetic line. The kinetic line with its divided mass and elasticity is symbolized in FIG. 3 by a spring with a decreasing wire gauge and distance of windings. When the impact occurs, the kinetic energy will be reflected at the beginning of both lines $x = 0$ and conveyed as energy waves W in both lines in directions $x$. The diagram in FIG. 3 shows that the mass $m'$ is reduced with distance $x$ providing from the impact location $x=0$, whereas the elasticity $e'$ increases.

The energy wave W is thereby transformed with the growing distance $x$ from the high pressure to high velocity amplitudes. Thus it is again possible to attenuate the energy wave W sufficiently by known elastic material which have higher inner energy losses. An approximately constant conveying velocity of the kinetic line is of advantage. This is the case if the product of the mass $m'$ times elasticity $e'$ remains approximately constant independent of the distance $x$.

Figure 4:
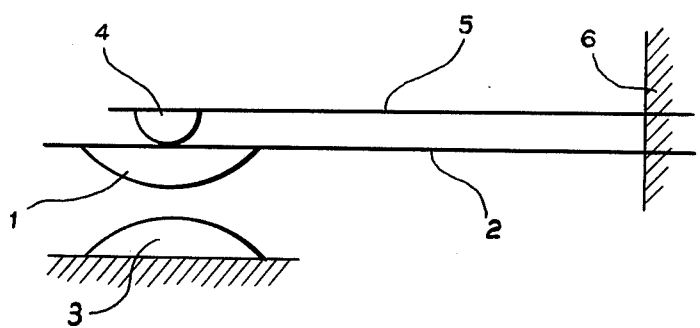
FIG. 4 is a schematic of the application of the chatter-free mass arrangement according to this invention in an electro-mechanical contact.

FIG. 4 shows schematically the application of the above principles to a chatter-free mass arrangement in accordance with this invention for its application to an electromechanical contact. The movable contact consists of a contact mass 1 and its contact blade 2 arranged to face a fixed counter contact 3. On the rear side of contact mass 1 there is positioned an additional mass 4. Both springs 2 and 5 are fixed to a housing 6 by any known means. As soon as the contact mass 1 is pushed against the counter contact 3, when closing, the kinetic energy of the contact mass 1 will be conveyed to mass 4 by reflection on counter contact 3. The kinetic energy reduced by the impact loss and remaining in the following mass 4 is either absorbed in a known manner, e.g. by attenuation losses in spring 5 or in its attachment to housing 6 or in another attachment or by a known friction attenuator and preferably by a layer 8 to be described below in connection with FIGS. 7, 8 and 9.

Figure 5:
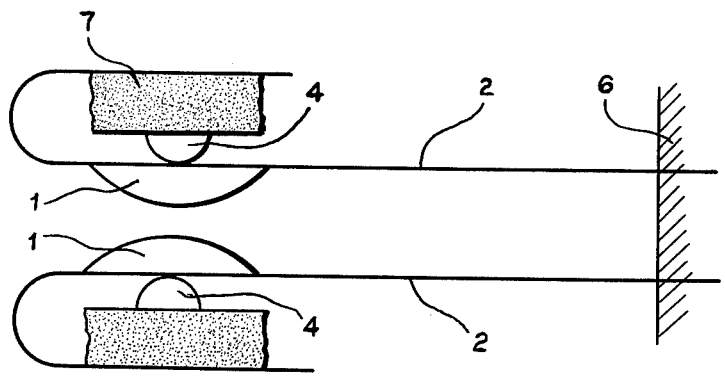
FIG. 5 is a schematic illustration of an example of the mass arrangements in accordance with this invention applied to two movable contacts.

FIG. 5 shows schematically an example of an embodiment of the mass arrangement in accordance with this invention with useful damping material 7, for example for two movable contacts 1. The two movable contacts each consists of a contact mass 1 and a contact spring 2 which are fixed on a housing 6 facing each other and are touched by masses 4 under a biasing tension by an extension of the contact blade 2. As soon as the contact masses 1 are pushed together, when closing, the kinetic energy of contact masses 1 will then be conveyed to the related masses 4 during the impact by reflection, so that this kinetic energy leaves the contact masses 1 for a very short moment with a relatively high velocity. In the attenuating pad 7, fixed on one side of the contact blades 2 which are attched on the other side of masses 4, the masses 4 are damped so much that upon return to the contact masses 1 they cannot be initiated so as to chatter any more and therefore remain rested on each other.

Figure 6:
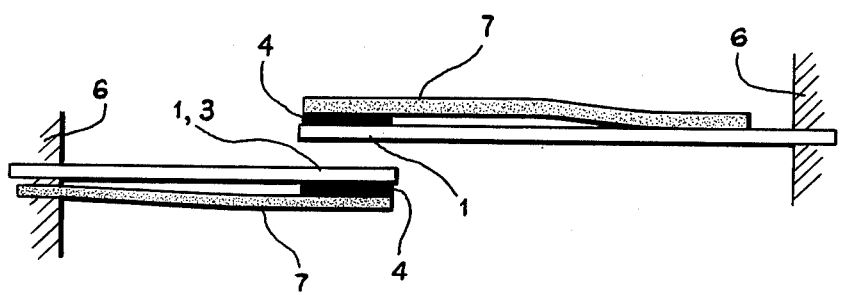
FIG. 6 illustrates the embodiment of the method in accordance with this invention applied to reed contacts.

FIG. 6 shows in principle an example of a useful embodiment of the method and arrangement of this invention for reed contacts. In order to attenuate or convey the energy of the movable masses respectively, they are carried by damping carrier 7 which for instance are fixed on contacts 1 (see the right contact) or on the housing 6 (see the left contact). It is important in this embodiment of this invention that the mass 4 is smaller than the mass of contact 1 which is associated with the impact. In this embodiment it is especially advantageous that there exists the following rule for the part of the mass of contact 1 associated with the impact that the product of mass times elasticity of this part of the mass is approximately equal to the product of mass 4 times elasticity between the mass 4 and the contact mass 1 or 3, respectively.

FIG. 7 shows in principle an electro-mechanical contact which has applied to a kinetic line in accordance with the teachings of this invention which is positioned on a contact mass 1 as a layer 8. The contact mass 1 can also, by itself, be a part of this kinetic line. A movable contact consisting of contact 1 and the contact blade 2 is positioned opposite a counter contact 3 for simplification. On the rear side of the contact mass 1 in the direction of the impact there is fixed the impedance transforming and attenuating kinetic line klayer 8 according to this invention. As soon as the movable contact 1 touches the counter contact 3, the kinetic energy of the movable contact mass 1 will be conveyed by reflection at the starting point $x=0$ of the kinetic line (chatter layer 8). After this, an attenuated impact wave runs in the direction $x$ through the chatter layer 8. After the double conveying time of the impact wave through the chatter layer 8 with the thickness (length of the line), the energy wave returns to the contact mass 1 and is thereby attenuated in such a manner that the contact mass 1 cannot be excited to chatter.

It is of an advantage in this embodiment according to this invention that the product of the mass $m'$ and the elasticity $e'$ for each location $x$ remains approximately constant. However, the ratio between the mass $m'$ to elasticity $e'$ must be reduced with the distance $x$ to effect a velocity transformation to higher velocities with growing distance $x$ and thereby making effective a damping within the chatter layer 8 by inner friction. This means that the mass $m'$ must be reduced with distance $x$ and the elasticity $e'$ must increase in accordance with the constant product. This can be achieved for instance by a change of cross section of the chatter layer 8 as exemplified in FIG. 7 but may also be achieved by the change in the properties of the material, i.e., specific weight or elasticity.

It is a further advantage to provide that the ratio of mass to elasticity at the distance $x=d$ of the chatter layer 8 is small. This means that the end of chatter layer 8 must have a relatively small weight compared to its beginning when $x=0$ but it must have a greater energy loss. Accordingly, the complete weight, $$(\int_0^a m'(x)\,dx)$$

of the chatter layer 8 must be, however, as small as possible so as to contribute in the smallest way to the complete moving energy of the movable contact.

FIG. 8 shows an example of an embodiment of the invention in which the chatter layer is advantageously comprising two swinging elements which are made up in layers. Again there is a contact schematically shown by a movable contact consisting of a contact mass 1 and a contact blade or a spring 2 and a fixed counter contact 3. On the rear side of the contact mass 1 there is provided in adjacent sequence: a poorly elastic spring element 9, a heavy mass element 10, a very elastic spring element 11 and a very light mass element 12. The largest energy loss occurs in the last spring element 11 and light mass element 12.

The layers are not confined to the area of the contact but can cover a larger part of the blade 2 or the whole of blade 2 if this area is endangered by chattering. There can also be one pair of layers only, i.e., one mass layer and one elastic layer only.

FIG. 9 shows an example of an embodiment in accordance with this invention in a reed contact in which the contact 1 and the counter contact 3 are provided with chatter layers 8 in accordance with the description above. Also in this example, the chatter layer 8 can be made up either by continuously changing of the size or of the properties of the material (weight, elasticity and loss) or in which it can be made up by one or more spring elements (layers).

As previously stated the mass arrangement in accordance with this invention which reduces chatter can be applied independently of the size and shape of a mechanical arrangement. In addition to the special advantageous use in mechanical contacts in switches and relays, it must be emphasized that it can be used with other machine parts which are endangered by chatter and shock.

For example FIG. 10 shows a vehicle wheel M having a mass M which is fixed via an axle A at a pivoting point 0, the mass M being endangered by chatter having the elasticity E with respect to the fixed ground MG. In the vicinity of the wheel M there are arranged one or more smaller masses m with the elasticity $e$ according to this invention attached to the mass M by means of an attenuator D on the axle A. It is especially advantageous in this arrangement to provide that mass M times elasticity E is approximately equal to mass m times elasticity $e$.

It will be understood by those skilled in the art that the principles of this invention have been illustrated in specific embodiments but that variations can be made without departing from the scope of the appended claims.

What is claimed is:

1. An electrical contact device having two contact members each of which has a specific elasticity and weight, at least one of said contact members being movable, additional members having different weights and elasticities arranged in relation to one of said contact members in the direction of the push from the rear side of said at least one contact member comprising means for taking over the kinetic energy from said contact members in said pushing direction starting with said at least one movable contact member, said additional members weights decreasing and said elasticities increasing in the direction of said push providing an energy loss factor which increases in the direction of said push whereby the product of said weight times said elasticity of said at least one contact member and of each of said additional members is approximately equal to avoid rebound of said movable contact member and effectively transferring the kinetic energy upon impact caused by said contact members.

2. An electrical contact device in accordance with claim 1, wherein said at least one movable contact member is arranged with said additional members in the said direction of push starting with said contact member with the said weight of each following member having a weight which is between two thirds and one tenth of the weight of the preceding member.

3. An electrical contact device in accordance with claim 1, wherein said additional members are provided by layers carried on the rear side of said at least one movable contact member.

4. An electrical contact device having at least two contact members each of which has a predetermined elasticity and weight and at least one of said contact members being movable with respect to the other, including additional members arranged on the rear side of said at least one movable contact member in the direction of push starting with said movable contact member, approximating a kinetic transmission line, said additional members having a specific elasticity per unit length and weight per unit length and including means for taking over the kinetic energy from said movable contact member in the direction of push starting with said movable contact member, said additional members being arranged so that the ratio of the weight per unit length to elasticity per unit length of said kinetic transmission line decreases and, in the same push direction, the energy loss factor increases.

5. An electrical contacting device in accordance with claim 4, wherein the product of said weight per unit length times said elasticity per unit length is approximately constant along said kinetic transmission line.

* * * * *